April 17, 1951  J. L. PICKETT  2,549,129
CARRIER ACCESSORY FOR VEHICLES
Filed Jan. 26, 1949  4 Sheets-Sheet 1
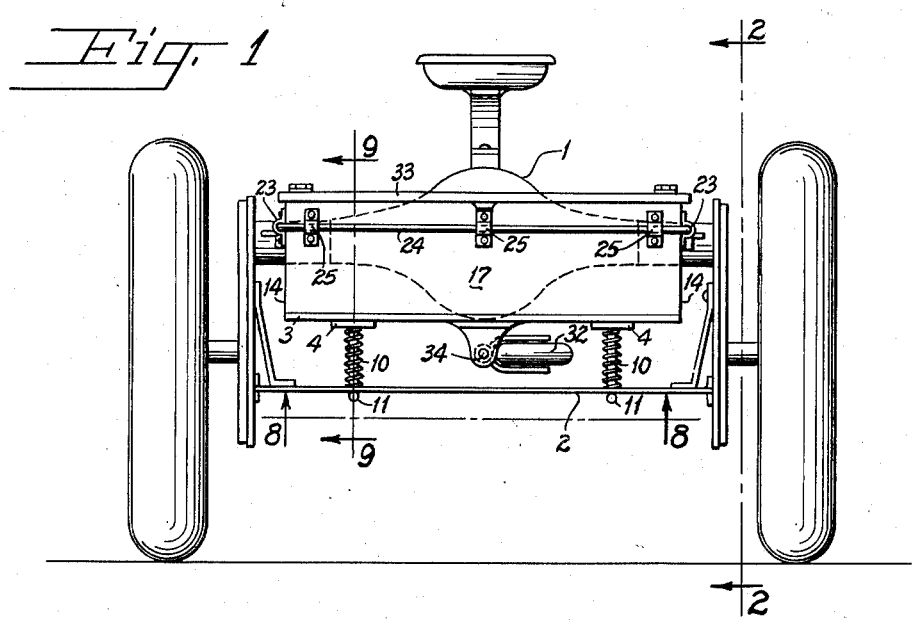
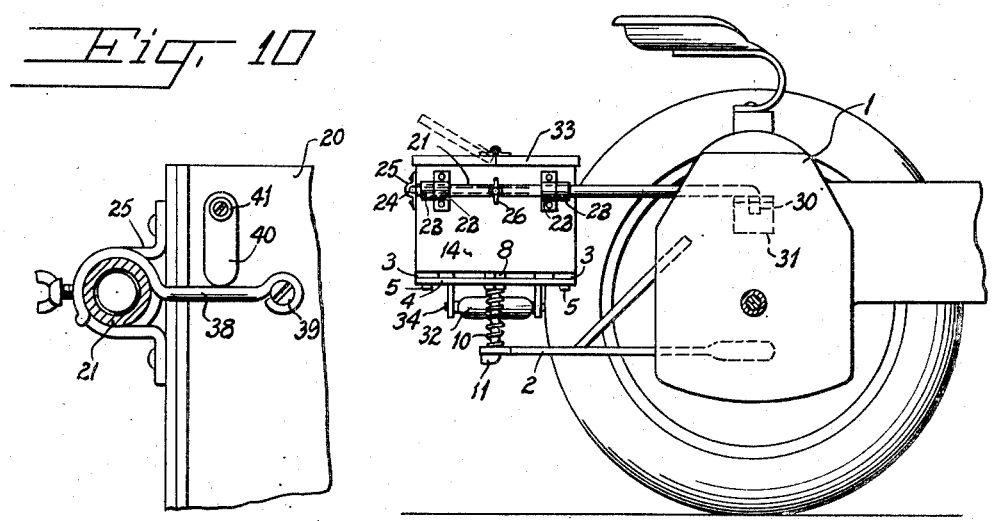
INVENTOR.
Jewell L. Pickett
ATTORNEY

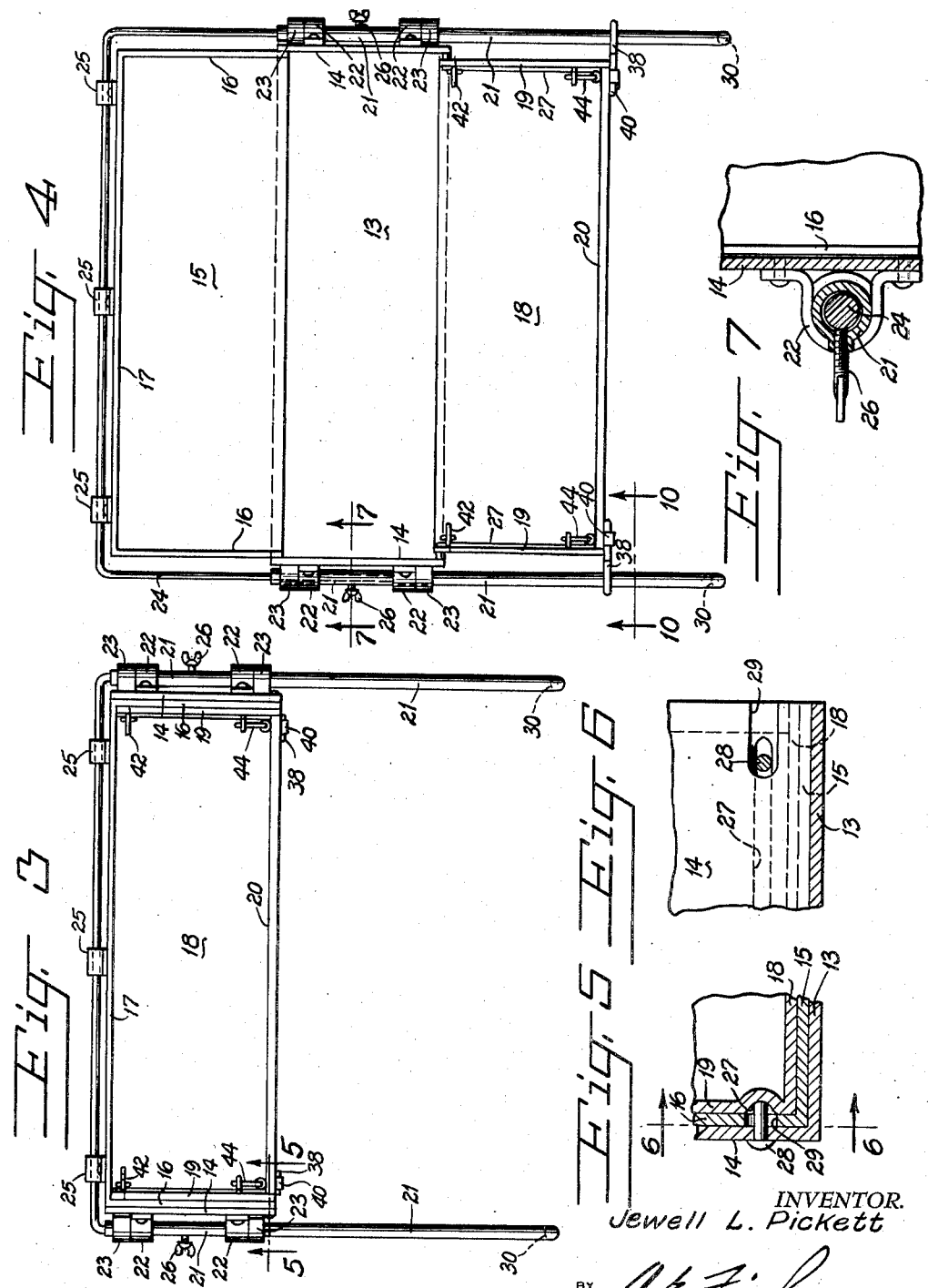

April 17, 1951 J. L. PICKETT 2,549,129
CARRIER ACCESSORY FOR VEHICLES
Filed Jan. 26, 1949 4 Sheets-Sheet 3
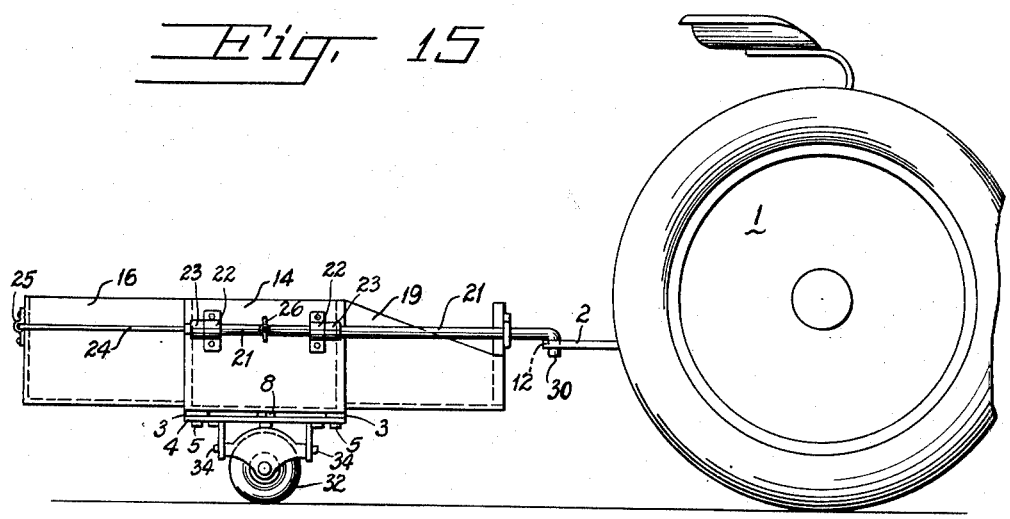
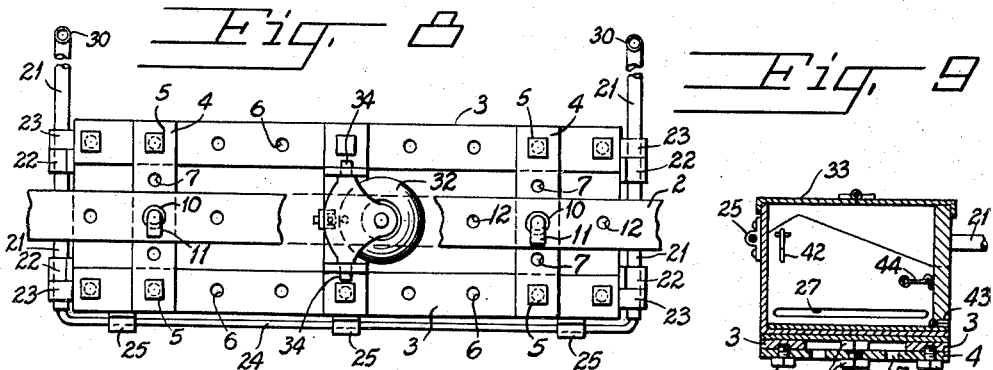
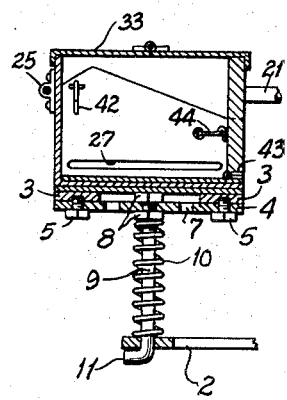
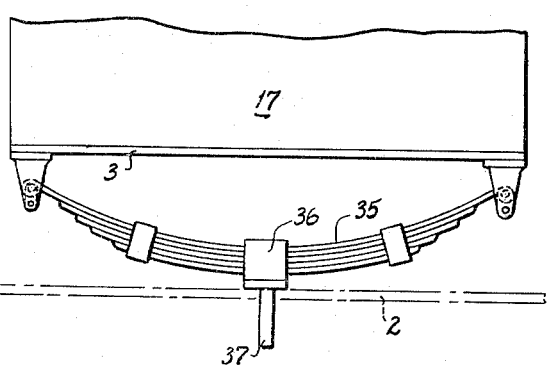
INVENTOR.
Jewell L. Pickett
BY
ATTORNEY

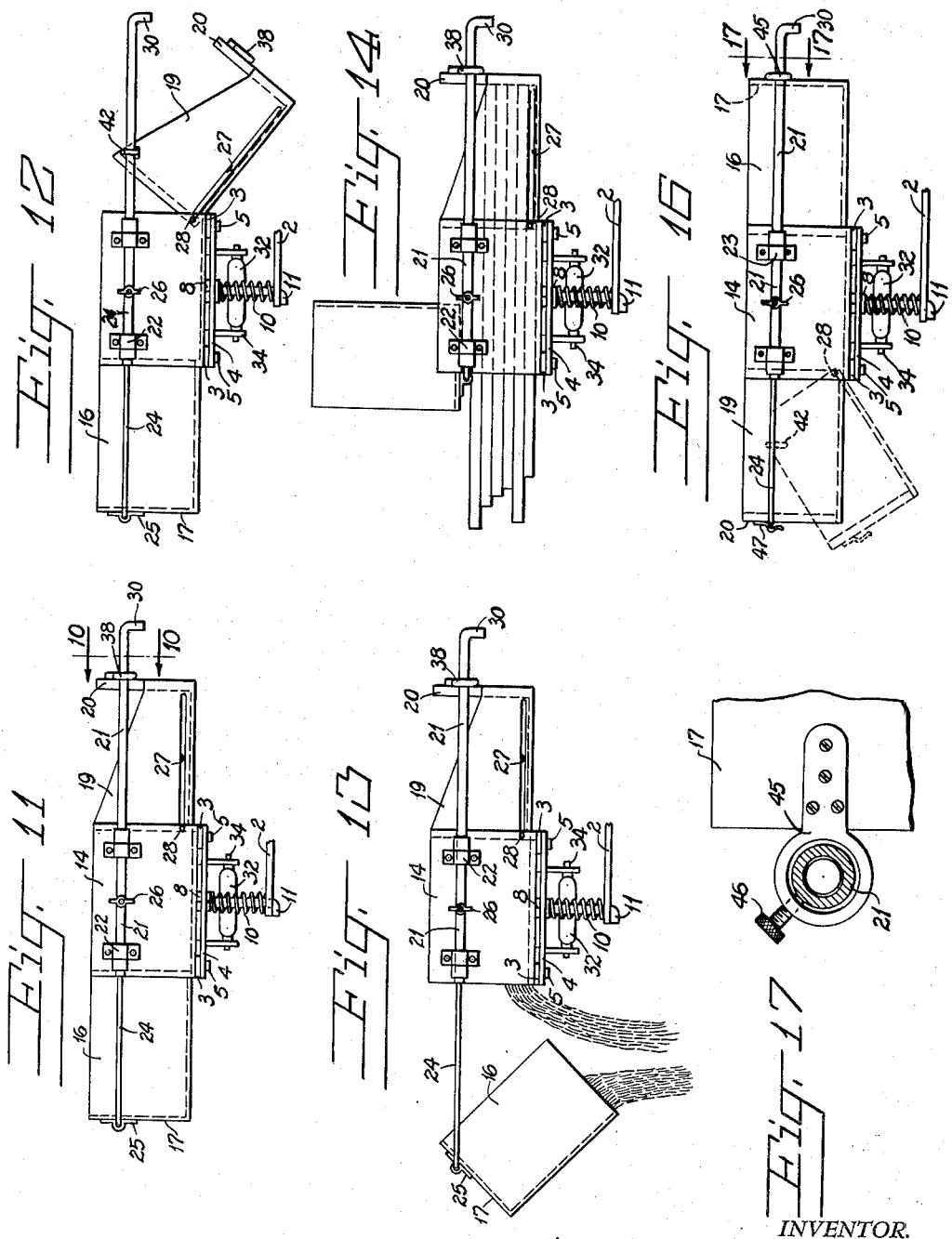

Patented Apr. 17, 1951

2,549,129

UNITED STATES PATENT OFFICE 2,549,129

CARRIER ACCESSORY FOR VEHICLES

Jewell L. Pickett, Hannibal, Mo.

Application January 26, 1949, Serial No. 72,840

2 Claims. (Cl. 296—26)

This invention pertains to carriers designed as accessories to vehicles such as tractors, automobiles, motorcycles and the like, to be attached to the vehicle when needed to carry luggage, work materials or even extra passengers.

One of the objects of the invention is to provide a carrier which is adapted to be easily attached to a vehicle, more particularly such a vehicle as a farm tractor, to carry materials such as seed, tools, lumber or small live stock, or for carrying passengers.

Another object is to provide such a carrier which is adjustable to small or large capacity as the occasion requires.

Another object is to provide such a carrier of flexible or adjustable construction, whereby it can be varied in its arrangement form to accommodate such different kinds of loads, as passengers, tools, lumber or bulk materials such as grain or feed.

Further objects will appear from the following specification, in which will be set forth an illustrative embodiment of this invention. It is understood, however, that this invention is susceptible of various modifications, within the scope of the appended claims, without departing from the principles or spirit of the invention.

An embodiment of this invention adapted for use with a farm tractor is illustrated in the accompanying drawings, in which Figure 1 is a view in rear elevation of a carrier embodying this invention as mounted on a farm tractor.

Figure 2 is a side view taken as a section on line 2—2 of Figure 1.

Figure 3 is a plan view of the carrier only, shown in collapsed or contracted position and with the lid removed.

Figure 4 is a plan view, similar to Figure 3, but showing the carrier sections in extended positions.

Figure 5 is an enlarged detail section on line 5—5 of Figure 3.

Figure 6 is an enlarged detail section on line 6—6 of Figure 5.

Figure 7 is an enlarged detail section on line 7—7 of Figure 4.

Figure 8 is a bottom plan view of the supporting frame, taken on line 8—8 of Figure 1.

Figure 9 is a vertical section of the carrier on line 9—9 of Figure 1.

Figure 10 is an enlarged detail section on line 10—10 of Figure 4.

Figure 11 is a side view of the carrier with the sections thereof fully extended.

Figure 12 is a similar view showing the front section in lowered position.

Figure 13 is a similar view showing the rear section moved clear to permit dumping.

Figure 14 is a similar view showing the arrangement for carrying lumber.

Figure 15 is a side view of the carrier fully expanded and arranged on a road wheel to be hauled as a trailer.

Figure 16 is a side view similar to Figure 11 but showing the front and rear sections reversed.

Figure 17 is an enlarged detail section on line 17—17 of Figure 16.

Figure 18 is a fragmentary rear view showing a modified form of support for the carrier.

In accordance with the invention, generally stated, a box-carrier is provided for mounting on the rear of a vehicle, as on the drawbar of a tractor. The box is formed in telescoping sections which may be expanded or contracted to vary the load capacity thereof. The structure is further arranged for various other adjustments to adapt the same for carrying loads of different kinds of materials, and for either mounting the carrier on the vehicle or supporting it on a road wheel to be hauled as a trailer.

In the embodiment illustrated, I designates the vehicle to which the carrier is attached, in this case a farm tractor. Such a vehicle usually has a frame part, such as a drawbar 2, on which the carrier may be mounted. A supporting bottom frame for the carrier is shown in Figure 8. This frame comprises a pair of end bars 3, extending laterally with reference to the direction of travel of the vehicle, and cross bars 4 joining said end bars. Cap screws 5, or other suitable fasteners, connect the cross bars to the end bars. Said screws 5 may engage any of a series of holes 6 in the bars 3 so that the lateral separation of the cross bars 4 may be adjusted. The cross bars are each provided with a series of perforations 7 in any of which may be mounted, as by means of nuts 8, an upright guide rod 9. Mounted on the rod 9 is a coil spring 10. The lower end of the rod 9 is bent over to provide a hook 11 adapted to be hooked into one of a series of perforations 12 usually provided in the drawbar 2. When so assembled the spring 10 rests on the drawbar 2 and provides a resilient support for the carrier.

Mounted on the above described supporting frame is the carrier box. This comprises, in the embodiment illustrated, a middle section having a bottom 13 and side walls 14, (see Figure 4) a rear end section having a bottom 15, side walls 16 and an end wall 17, and a front end section having a bottom 18, side walls 19 and an end wall 20. These sections are arranged to telescope with each other, the rear section fitting within the middle section and the front section fitting within the rear section. When so telescoped or contracted, the carrier is reduced in size and load capacity to that of a single section as shown in Figure 3. A hinged lid 33 may be provided to cover the carrier in this position.

The middle section is provided with side supports 21 in the form of tubes or pipes supported in brackets 22 secured to the side walls 14. The tubes 21 may be secured against endwise movement in the brackets 22 by suitable means such as collars 23. A support for the rear section is provided by a U-shaped bar 24, the rear portion of which engages brackets 25 on the end wall 17 and the legs of which telescope into the tubes 21, wherein they may be secured in any adjusted position by thumbscrews 26. The brackets 25 are loose on the rod 24 so as to provide a hinge on which the rear section may turn up or down.

The side walls 19 of the front end section are each formed with a horizontal groove 27 along the lower edge thereof. Each side wall 14 of the middle section has a pin 28 welded or otherwise secured thereto and extending into the groove 27 to provide a guide for the front end section when moved out. The groove 27 terminates short of the rear edge of the side wall 19. When the pins 28 engage the termini of the grooves 27, they limit the forward movement of the front section and also provide a hinge whereon said section may be lowered to the position shown in Figure 12. The side walls 16 of the rear section may each have formed therein a notch 29 (see Figure 6) positioned to clear the pin 28 when the sections are contracted to the position of Figure 3.

The side supports 21 are provided at their forward ends with securing means, such as the down-turned hook portions 30. These are arranged to engage complementary means 31 on the vehicle 1 to support and brace the carrier in its traveling position on the drawbar 2 as shown in Figure 2. The carrier may also be provided with a road wheel 32, preferably of the swiveling type, mounted in any suitable manner on the bottom frame 3, 4, as indicated in Figures 8 and 15. When disengaged from the drawbar, the carrier may be supported on the ground on the road wheel 32 and the securing ends 30 of the side supports 21 may be engaged in a pair of the holes 12 in the drawbar. The carrier is then in position for hauling as a trailer, as shown in Figure 15. The wheel 32 may be mounted on horizontal trunnions 34 so it may be folded up to an out-of-the-way position, Figure 1, where necessary to clear the drawbar when the carrier is mounted thereon.

Some types of tractors have the drawbar 2 provided with only a single hole in the middle for coupling implements thereto. In such a case the carrier may be mounted on a leaf spring 35 having a central bracket 36 provided with a pin 37 extending downward therefrom to engage such coupling hole, as indicated in Figure 18.

The above described structure is adapted for a variety of uses. When the carrier is contracted to its single-section capacity, as in Figures 1, 2, 3 and 9, it may be used to carry tools, small articles and the like. The lid 33 may be provided with a suitable lock to protect the contents. Either the front or the rear section only may be drawn out to extended position, thereby doubling the capacity of the carrier. When the rear section is extended, it is supported by the bar 24 which is secured in the side supports 21 by the thumbscrew 26. When the front section is extended, it may be fixed in horizontal position, as shown in Figure 11, by a laterally extending support arm 38, Figure 10, pivoted at 39 on the end wall 20 and hooked over the side support 21 on each side of the carrier. A stop 40, secured to the wall 20, rests on the arm 38 when extended, to support the front section. The stop 40 may be pivoted at 41 so that it may be swung aside to permit raising the arm 38 to disengage it from the support 21.

The front section may also be lowered by hinging on the pins 28 as described, to the position shown in Figure 12. Any suitable means, such as a hook 42 engaging each side support 21, may be provided to support the section in this position. When so arranged, the front section provides a foot rest for passengers who may be seated in the middle section. This arrangement may be used either with the rear section in collapsed position, in which case the passengers may use the rear end wall 17 for a back rest, or with said rear section extended as in Figure 12, in which case other load may be carried in addition to passengers. The front portions of the side walls 19 are shown cut away in Figure 12, and the front wall 20 may be hinged as indicated at 43, Figure 9. This may be necessary in some cases to clear parts of the tractor when moving the section to lowered position. The wall 20 may be retained in its upright position by suitable means such as hooks 44.

With both end sections fully extended as in Figure 11, larger articles or bulk materials may be carried. When carrying bulk materials, the same may be dumped by loosening the thumbscrews 26 and moving the rear section backward until it clears the middle section and drops down as shown in Figure 13.

The carrier may also be adapted for carrying lumber or similar material, by drawing out the rear section until it clears the middle section and turning it up on the bar 24 as a hinge to the position shown in Figure 14, thereby opening the end of the carrier. Or the rear section may be withdrawn entirely to accommodate a higher stack of lumber.

In some cases it may be desirable to turn the entire carrier end-for-end as indicated in Figure 16. In such a case what was the rear section in the foregoing arrangements, now becomes the front section and is supported on the side supports 21 by a ring bracket 45 on the end wall 17 on each side of the section, only one of which brackets appears in the drawing. The bracket 45 is secured in its adjusted position on the support 21 by a thumbscrew 46. The former front section, now the rear section, is supported on the bar 24 by one or more brackets 47 on the end wall 20. These are releasable from the bar 24 in order to lower the section to the position shown in dotted lines in Figure 16.

It will be seen, therefore, that this invention provides a carrier of very flexible structure that may be varied in shape and capacity to suit many different loads to be carried. It may be arranged to carry the load entirely on the vehicle or to support it on a road wheel and hauled as a trailer. It may, of course, be provided with more than one road wheel where extra heavy loads are to be carried. Thus an accessory of great utility is provided for use with vehicles of different kinds.

I claim:

1. In a carrier accessory for a vehicle, the combination comprising a basal frame, means supporting the frame for travel movement behind the vehicle, a carrier box assembly supported on the basal frame, said carrier box comprising a center section having a bottom and upstanding sides and front and rear sections each having a bottom, upstanding sides and an upstanding end, the said front and rear sections being telescopically assembled with each other and the center section for forward and rearward movements, tubular members supported on the sides of the center section and extending forwardly for connection to the vehicle, a U-shaped member extending across the rear of the rear section and having sides extending forwardly and telescoped into said tubular members, and the rear section of the carrier box being pivoted at its ends on said U-shaped member to swing clear of the center section for dumping a load and for carrying elongated loads in the box.

2. A carrier accessory of the character described for a vehicle, comprising a basal frame, means supporting the frame for travel movement with the vehicle, a carrier box comprising a center section and telescopically assembled front and rear sections, the said center section being supported on the basal frame and having a bottom and upright sides, the front section having a bottom and upright sides and a front end, the rear section having a bottom and upright sides and a rear end, tubular members secured to the sides of the center section and extending forwardly therefrom for attachment to the vehicle, a U-shaped member supported on the rear section and having sides extending forwardly into telescoping relation with the said tubular members, pins on the lower forward corners of the center section, the sides of the front section having forwardly and rearwardly extending grooves slidably and pivotally engaging said pins whereby the front section may tilt forwardly and downwardly when fully extended in a forward direction to thereby act as a foot rest for persons seated in the box, and means on the front section for engaging said tubular members and supporting said section in its forwardly extended position.

JEWELL L. PICKETT.

REFERENCES CITED

The following references are of record in the file of this patent:

UNITED STATES PATENTS

| Number | Name | Date |
|---|---|---|
| 223,545 | Seely | Jan. 13, 1880 |
| 733,889 | Wolfskill | July 14, 1903 |
| 1,500,395 | Kennedy | July 8, 1924 |
| 1,849,046 | Arndt | Mar. 8, 1932 |
| 2,080,709 | Hall et al. | May 18, 1937 |
| 2,425,892 | Michaels | Aug. 19, 1947 |
| 2,442,889 | Deal | June 8, 1948 |